US011481779B2

(12) United States Patent
Hambleton et al.

(10) Patent No.: US 11,481,779 B2
(45) Date of Patent: Oct. 25, 2022

(54) SYSTEM AND METHOD FOR AUTHORIZING A DEBIT TRANSACTION WITHOUT USER AUTHENTICATION

(71) Applicant: THE TORONTO-DOMINION BANK, Toronto (CA)

(72) Inventors: Scott Lawson Hambleton, London (CA); Steven Robert Langham, London (CA)

(73) Assignee: The Toronto-Dominion Bank, Toronto (CA)

( * ) Notice: Subject to any disclaimer, the term of this patent is extended or adjusted under 35 U.S.C. 154(b) by 986 days.

(21) Appl. No.: 16/131,807

(22) Filed: Sep. 14, 2018

(65) Prior Publication Data
US 2019/0012668 A1 Jan. 10, 2019

Related U.S. Application Data

(63) Continuation of application No. 14/645,814, filed on Mar. 12, 2015, now Pat. No. 10,096,027.
(Continued)

(51) Int. Cl.
*G06Q 20/40* (2012.01)
*G06Q 40/02* (2012.01)
*G06Q 20/38* (2012.01)

(52) U.S. Cl.
CPC ....... *G06Q 20/405* (2013.01); *G06Q 20/3821* (2013.01); *G06Q 20/3829* (2013.01); *G06Q 40/02* (2013.01)

(58) Field of Classification Search
None
See application file for complete search history.

(56) References Cited

U.S. PATENT DOCUMENTS 5,917,168 A 6/1999 Nakamura et al.
6,612,488 B2 9/2003 Suzuki
(Continued)

FOREIGN PATENT DOCUMENTS

AU 2010248794 A1 * 12/2011 ............ G06F 21/31
CN 107067246 A * 8/2017
(Continued)

OTHER PUBLICATIONS

Urien et el. Towards a secure Cloud of Secure Elements concepts and experiments with NFC mobiles, https://ieeexplore.ieee.org/document/6567224/?source=IQplus. (Year: 2013).*
(Continued)

*Primary Examiner* — El Mehdi Oussir
(74) *Attorney, Agent, or Firm* — Duane Morris LLP

(57) ABSTRACT

A method of authorizing a debit transaction involves a server receiving from a debit terminal an authorization request message requesting authorization for a debit transaction initiated from the debit terminal. The authorization request message includes a payment credential, a cryptogram and authorization data. The server authorizes the debit transaction without receiving confirmation of authenticity of an identity of an operator of the debit terminal. The server authorizes the debit transaction by confirming that the cryptogram was generated from the payment credential and the authorization data; determining from a database an account number and a default payment amount that is associated with the payment credential in the database, and debiting a financial account associated with the account number by a debit amount equal to the default payment amount. The server transmits to the terminal an authorization response message that authorizes the terminal to release funds in the debit amount.

13 Claims, 4 Drawing Sheets

Related U.S. Application Data

(60) Provisional application No. 61/951,561, filed on Mar. 12, 2014.

(56) References Cited

U.S. PATENT DOCUMENTS

| | | | |
|---|---|---|---|
| 9,514,458 B2* | 12/2016 | Rutherford | G06Q 20/341 |
| 9,652,604 B1 | 5/2017 | Johansson et al. | |
| 9,922,322 B2 | 3/2018 | Flurscheim et al. | |
| 9,959,531 B2 | 5/2018 | Purves et al. | |
| 9,972,005 B2 | 5/2018 | Wong et al. | |
| 10,510,073 B2* | 12/2019 | Wong | G06Q 20/322 |
| 2001/0054148 A1 | 12/2001 | Hoornaert et al. | |
| 2005/0256802 A1 | 11/2005 | Ammerman et al. | |
| 2012/0173436 A1 | 7/2012 | Smith | |
| 2012/0197743 A1 | 8/2012 | Grigg et al. | |
| 2013/0036050 A1 | 2/2013 | Giordano et al. | |
| 2013/0276080 A1 | 10/2013 | Nakonetzki et al. | |
| 2014/0040149 A1* | 2/2014 | Fiske | G07F 7/127 705/71 |
| 2014/0149293 A1 | 5/2014 | Laracey | |
| 2014/0195425 A1* | 7/2014 | Campos | G06Q 20/3674 705/41 |
| 2014/0237552 A1 | 8/2014 | Yoo | |
| 2014/0267079 A1 | 9/2014 | Duplan et al. | |
| 2015/0019442 A1* | 1/2015 | Hird | H04W 12/041 726/30 |
| 2015/0073995 A1* | 3/2015 | Hayhow | G06Q 20/4012 705/71 |
| 2015/0154595 A1* | 6/2015 | Collinge | H04L 63/0428 705/71 |
| 2015/0186871 A1 | 7/2015 | Laracey | |
| 2015/0262180 A1* | 9/2015 | Hambleton | G06Q 20/3829 705/44 |
| 2017/0046679 A1* | 2/2017 | Gotlieb | G06K 19/06206 |
| 2019/0188705 A1* | 6/2019 | Ecker | G06Q 20/40 |
| 2021/0312440 A1* | 10/2021 | Badal-Badalian | G06Q 20/3221 |

FOREIGN PATENT DOCUMENTS

| | | | | |
|---|---|---|---|---|
| GB | 2512944 A | * | 10/2014 | G06Q 20/3274 |
| JP | 62174892 | | 1/1986 | |
| KR | 20090116813 A | * | 4/2001 | G06Q 20/04 |

OTHER PUBLICATIONS

O. Ogundele et al. "The Implementation of a Full EMV Smartcard for a Point-of-Sale Transaction and Its Impacton the PCI DSS," 2012 International Conference on Privacy, Security, Risk and Trust, pp. 797-806. https://ieeexplore.ieee.org/document/6406326?source=IQplus (Year: 2012).*

"Arithmetic Logic Unit," retrieved from https://en.wikipedia.org/wiki/Arithmetic_logic_unit on Dec. 30, 2021 (8 pages).

* cited by examiner

SYSTEM AND METHOD FOR AUTHORIZING A DEBIT TRANSACTION WITHOUT USER AUTHENTICATION

RELATED APPLICATIONS

This patent application is a continuation of U.S. patent application Ser. No. 14/645,814, filed Mar. 12, 2015, entitled "System and Method for Authorizing a Debit Transaction Without User Authentication", and claims the benefit of the filing date of U.S. patent application Ser. No. 61/951,561, filed Mar. 12, 2014, the disclosures of which are both hereby incorporated by reference herein to their entireties.

FIELD

This patent application relates to a system and method for authorizing a financial transaction. In particular, this patent application describes a system and method for authorizing a debit transaction using a payment token.

BACKGROUND

A financial institution customer might attend at a debit terminal to withdraw funds from one of the customer's financial accounts. Consistent with the conventional two-factor authentication methodology, the debit terminal prompts the customer to provide a payment card and a personal identification number to authenticate to the financial institution. The debit terminal typically also prompts the customer to input a desired debit amount for the funds withdrawal. The desired funds are dispensed from the debit terminal only after the customer has successfully authenticated to the financial institution, and the financial institution has approved the debit amount. The time required to complete the funds withdrawal can be particularly lengthy if the customer does not correctly input the personal identification number that is associated with the payment card, or inputs a desired debit amount that exceeds a maximum daily/weekly withdrawal limit set by the financial institution.

SUMMARY

This patent application discloses a computer server and associated method in which the bearer of a payment token uses a debit terminal to debit a financial account, but without authentication of the bearer of the payment token.

In accordance with a first aspect of this disclosure, there is provided a method of authorizing a debit transaction that involves a debit terminal transmitting to a computer server an authorization request message requesting authorization for a debit transaction that was initiated from the debit terminal. The authorization request message includes a payment credential, an online cryptogram and authorization data.

The computer server receives the authorization request message, and authorizes the debit transaction without receiving confirmation of authenticity of the identity of the operator of the debit terminal.

The computer server authorizes the debit transaction by:
  (i) confirming that the online cryptogram was generated from the payment credential and the authorization data,
  (ii) from a payment definition database, determining an account number and a default payment amount associated with the payment credential in the payment definition database, and
  (iii) debiting a financial account associated with the account number by a debit amount equal to the default payment amount;

The computer server then transmits to the debit terminal an authorization response message that includes the debit amount. The debit terminal receives the authorization response message. Without confirming the authenticity of the identity of the operator of the debit terminal, the debit terminal releases funds in the debit amount in response to the authorization response message.

In accordance with a second aspect of this disclosure, there is provided a credential processing server that includes a memory, a payment definition database, and a computer processing unit. The memory stores computer processing instructions. The computer processing unit is in communication with the memory and the computer payment definition database.

The computer processing instructions configure the computer processing unit to receive from a debit terminal an authorization request message requesting authorization for a debit transaction initiated from the debit terminal. The authorization request message includes a payment credential, an online cryptogram and authorization data.

The computer processing instructions configure the computer processing unit to authorize the debit transaction without receiving confirmation of authenticity of an identity of an operator of the debit terminal.

The computer processing instructions configure the computer processing unit to authorize the debit transaction by:
  (i) confirming that the online cryptogram was generated from the payment credential and the authorization data,
  (ii) from the payment definition database, determining an account number and a default payment amount associated with the payment credential in the payment definition database, and
  (iii) debiting a financial account associated with the account number by a debit amount equal to the default payment amount.

The computer processing instructions also configure the computer processing unit to transmit to the debit terminal an authorization response message that includes the debit amount and authorizes the debit terminal to release funds in the debit amount.

In one implementation, the debit terminal transmits the authorization request message to the computer server without confirming the authenticity of the identity.

The computer server may confirm the online cryptogram by:
  decrypting the online cryptogram with the payment credential;
  computing a message authentication code from the authorization data; and
  confirming that the computed message authentication code matches the decrypted cryptogram.

The computer server may decrypt the online cryptogram by:
  recovering a session key by applying the payment credential and a cryptographic master key as inputs to a cryptographic algorithm; and
  decrypting the online cryptogram with the session key.

The computer server may debit the financial account by:
  transmitting a debit request message to another computer server that manages the financial account (wherein the debit request message includes the account number and the default payment amount); and receiving from the another computer server a debit response message that confirms the debiting of the financial account by the debit amount.

In one implementation, the debit terminal receives the online cryptogram from a payment token that is interfaced with the debit terminal, and the server confirms the online cryptogram without receiving confirmation of authentication of the payment token.

In one implementation, the debit terminal includes an input device, and the debit terminal transmits the authorization request message without receiving input from the input device.

In one implementation, the server confirms the online cryptogram without receiving confirmation of authentication of the payment token.

BRIEF DESCRIPTION OF THE DRAWINGS

An exemplary debit processing network, debit terminal, and method for authorizing a debit transaction will now be described, with reference to the accompanying drawings, in which.

DETAILED DESCRIPTION

Debit Processing Network

Figure 1:
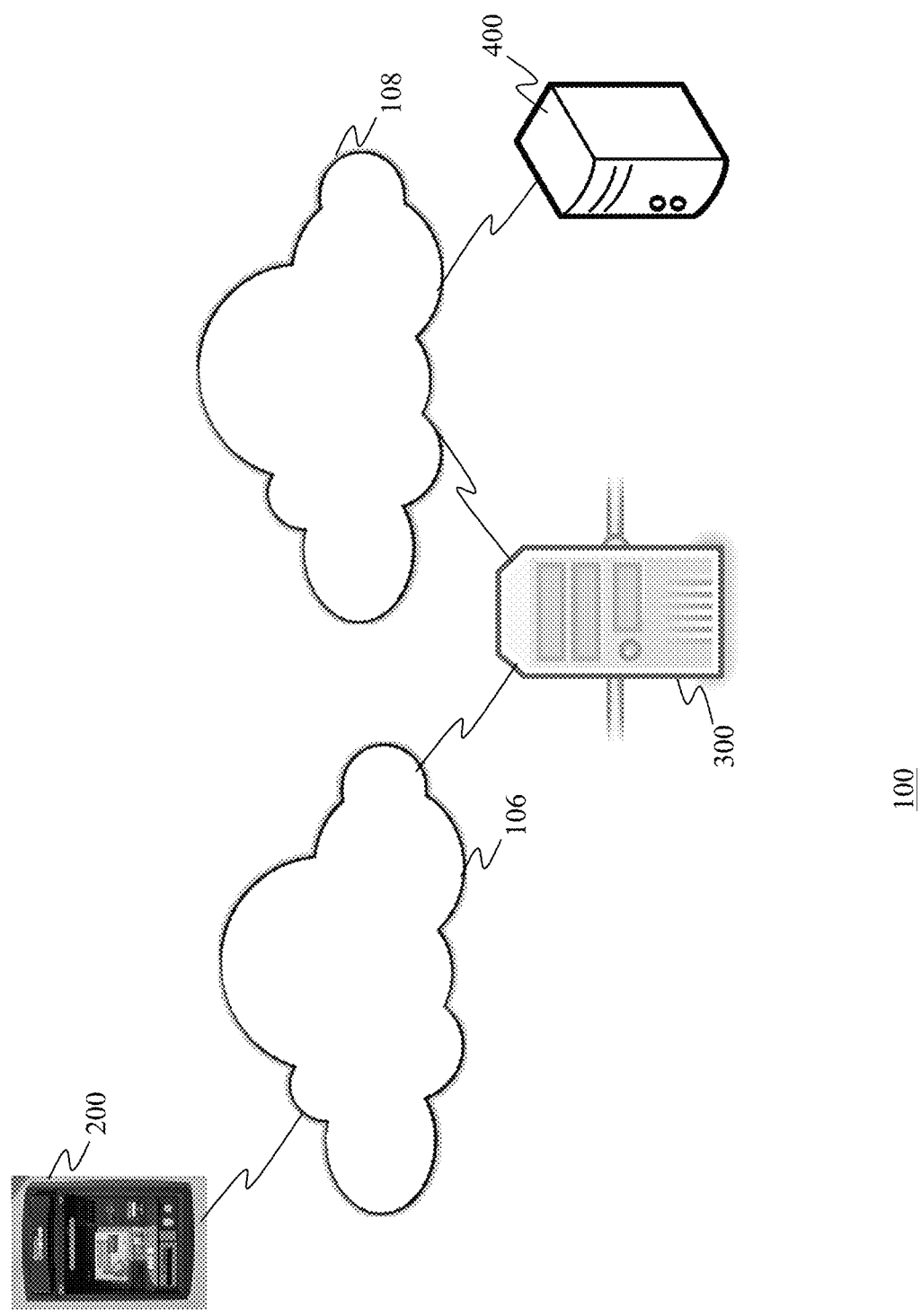
FIG. 1 is a schematic view of the debit processing network, depicting a debit terminal, and a credential processing server.

FIG. 1 is a schematic view of a debit processing network, denoted generally as 100. As shown, the debit processing network 100 comprises a debit terminal 200, a credential processing server 300, and a financial institution server 400. Although the debit processing network 100 is shown comprising only a single debit terminal 200 and a single credential processing server 300, the debit processing network 100 typically comprises a plurality of the debit terminals 200 and a plurality of the credential processing servers 300.

Typically, the debit terminals 200 are each implemented as an automated teller machine (ATM) or an automated banking machine (ABM) and are configured to communicate with a respective one of the credential processing servers 300 via a first secure network 106.

The credential processing server 300 and financial institution server 400 are each associated with and administered by a common financial institution. The financial institution issues payment credentials to its customers (or authorizes a third party to issue the payment credentials). The financial institution server 400 maintains financial accounts for each of a plurality of its customers, and is configured to communicate with the credential processing server 300 via a second secure network 108. The credential processing server 300 maintains a mapping between the payment credentials and the financial accounts maintained by the financial institution server 400.

Although the credential processing server 300 and financial institution server 400 are shown in FIG. 1 as being separate entities, the functionality of the credential processing server 300 may be incorporated into the financial institution server 400.

Debit Terminal

The debit terminal 200 includes an input device, a display device, a cash dispenser, and a computer processing unit that is coupled to the input device, the display device and the cash dispenser. The debit terminal 200 also includes a payment token interface that is coupled to the computer processing unit and is configured to communicate with a payment token.

The input device may be implemented as a keyboard, touchpad, touchscreen or other input device suitable for allowing a user of the debit terminal 200 to input data and/or commands that may be required to complete financial transaction, such as a debit transaction. The display device may be implemented as a liquid crystal display (LCD) panel, cathode ray tube (CRT) display, plasma display panel, or other display device suitable for displaying transaction information to the user. The cash dispenser dispenses cash to the customer, under control of the computer processing unit.

Payment Token

Each payment token is issued by a respective financial institution, and may be implemented as computer software, or as an integrated circuit device that includes a built-in micro-controller and protected memory. Preferably, the payment token provides a secure self-contained secure memory for storing a payment credential and cryptographic keys, and a secure computing environment for running cryptographic (e.g. data encryption standard (DES), triple-DES, advanced encryption standard (AES)) algorithms.

The payment token may have a contactless (e.g. NFC and/or ISO 14443 based) form factor, and may communicate with the debit terminal 200 via a wireless protocol, such as ISO 14443. For example, the payment token may be implemented as a contactless smartcard or integrated circuit payment card (e.g. credit card, debit card), or as an integrated circuit or computer software deployed within a wireless telephone or wireless data messaging device, and the payment token interface of the debit terminal 200 may be configured to communicate with the payment token using near-field communication or Bluetooth.

Alternately, the payment token may have a contact form factor, and may interface directly with the debit terminal 200. For example, the payment token may be implemented as a contact-style smartcard or integrated circuit payment card (e.g. credit card, debit card). The payment token interface of the debit terminal may be configured to communicate with the payment token via a physical port (e.g. card reader) of the debit terminal 200.

The payment token is configured with a payment credential and expiry date, and may also store one or more private cryptographic keys and corresponding public digital certificates. The payment credential may consist of a series of numbers, letters and/or symbols. The payment credential and private cryptographic key(s) are uniquely associated with the payment token by the financial institution that issued the payment token. Each private cryptographic key and the public cryptographic key of the corresponding public digital certificate comprise an asymmetric cryptographic key pair. Each public digital certificate is signed by the issuer of the payment token. The payment token may also be configured with a payment token cryptographic master key that is uniquely associated with the payment token, and a public digital certificate of the issuer of the payment token.

Where the payment token is implemented as a payment card, the payment credential, expiry date, cryptographic key(s) and public certificate(s) may be stored in the payment token prior to delivery to the customer. Where the payment token is implemented in software executing on a portable communications device, the payment token may be configured with the payment credential, expiry date, cryptographic key(s), and public certificate(s) when the payment token is installed on the portable communications device.

Credential Processing Server

Figure 2:
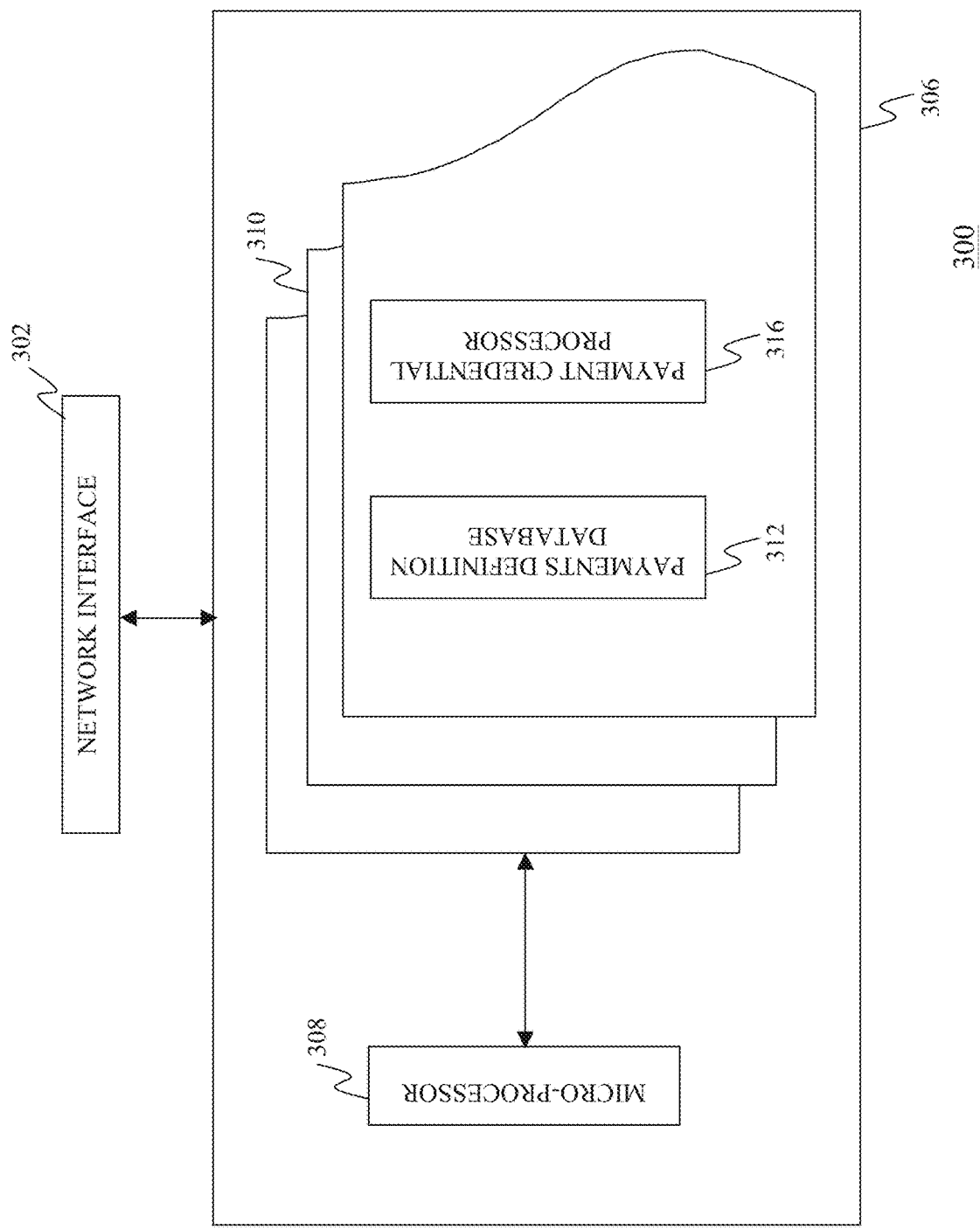
FIG. 2 is a schematic view of the credential processing server.

The credential processing server 300 comprises a computer server, and is configured to process debit transactions initiated at the debit terminal(s) 200. As shown in FIG. 2, the credential processing server 300 includes a network interface 302, and a computer processing system 306 that is coupled to the network interface 302.

The network interface 302 interfaces the credential processing server 300 with the debit terminal(s) 200 via the first secure network 106, and interfaces the credential processing server 300 with the financial institution server 400 via the second secure network 108.

The computer processing system 306 may include one or more microprocessors 308 and a computer-readable medium 310. The computer-readable medium 310 may be provided as electronic computer memory (e.g. flash memory) or optical or magnetic memory (e.g. compact disc, hard disk). The computer-readable medium 310 maintains a secure payment definition database 312 that includes a plurality of clusters each associated with a respective financial account maintained by the financial institution server 400.

Each cluster comprises a plurality of database records that identify a unique payment credential, the account number of the associated financial account maintained by the financial institution server 400, and a default payment amount for each debit transaction. The payment credential is uniquely associated with the account number. Preferably, the payment credential does not identify the financial account number or the payment amount to be debited during the debit transaction, and the financial account number and default payment amount are not recoverable or determinable from only the associated payment credential.

The issuer of the payment token may ensure that each payment credential is uniquely associated with a payment token by employing any suitable database and/or cryptographic technique known in the art, including generating each payment credential from a pseudo-random number generator or noise generator. The issuer may also confirm that each payment credential is unique within the payment definition database 312, and may save each new payment credential in the payment definition database 312 only after confirming that the administrator has not previously assigned the new payment credential to a payment token.

Each cluster may also identify a maximum total debit amount that may be withdrawn from the associated financial account, using the credential processing server 300, within a predetermined period of time. The network interface 302 may also interface the credential processing server 300 with user communication devices to allow customers of the financial institution to set their respective default payment amount and optionally also to set their respective maximum total debit amount.

The computer-readable medium 310 also maintains non-transient computer processing instructions stored thereon which, when executed by the microprocessor(s) 308, define an operating system (not shown) that controls the overall operation of the credential processing server 300. The computer processing instructions also implement a payment credential processor 316.

The payment credential processor 316 is configured to receive from the debit terminal 200 an authorization request message requesting authorization for a debit transaction initiated from the debit terminal 200. The authorization request message includes a payment credential provided by the payment token that is interfaced with the debit terminal 200. The payment credential is uniquely associated with the payment token.

The payment credential processor 316 is configured to determine the financial account and the default payment amount for the debit transaction by querying the payment definition database 312 with the received payment credential. The authorization request message excludes an indication of the determined financial account and default payment amount. Further, preferably the payment definition database 312 comprises a secure database that is accessible only by the credential processing server 300 and optionally the financial institution server 400. Therefore, particulars of the determined financial account and default payment amount should not be determinable from only the payment credential.

The payment credential processor 316 is also configured to authenticate the authorization request message, and to facilitate a debit in the default payment amount from the financial account. The payment credential processor 316 is further configured to receive the authorization request message, determine the financial account and the default payment amount, authenticate the authorization request message and facilitate the debit all without confirmation of authentication of a bearer of the payment token (e.g. without requiring input of a personal identification number).

Although the payment credential processor 316 is typically implemented as computer processing instructions, all or a portion of the functionality of the payment credential processor 316 may be implemented instead in electronics hardware, such as a field programmable logic gate array (FPGA) or a complex programmable logic device (CPLD).

Financial Institution Server

The financial institution server 400 is implemented as a computer server, and is configured to effect a debit transaction from a financial account maintained by the associated financial institution. The financial account may comprise any of a savings account, a chequing account, a credit account and a line of credit account.

The financial institution server 400 maintains a secure accounts database that includes a plurality of clusters each associated with a respective financial account. Each cluster typically identifies an account number of the associated financial account and credit/deposit entries to the associated financial account.

Method of Authorizing a Debit Transaction

As discussed, the debit processing network 100 implements a method of authorizing a debit transaction. A sample embodiment of the transaction authorizing method will be discussed with reference to FIGS. 3*a* and 3*b*. As will be explained, in this embodiment the credential processing server 300 receives from a debit terminal 200 an authorization request message requesting authorization for a debit transaction initiated from the debit terminal 200. As discussed above, the credential processing server 300 is in communication with a payment definition database 312 that associates a plurality of payment credentials each with a respective financial account and a default payment amount. The authorization request message includes a payment credential that is provided by the payment token that is interfaced with the debit terminal 200. The payment credential is uniquely associated with the payment token.

The credential processing server 300 determines the financial account and the default payment amount for the debit transaction by querying the payment definition database 312 with the received payment credential. The authorization request message excludes an indication of the determined financial account and default payment amount. Particulars of the determined financial account and default payment amount are not determinable from only the payment credential.

The credential processing server 300 authenticates the authorization request message, and facilitates a debit in the default payment amount from the financial account. The credential processing server 300 performs the receiving, determining, authenticating and facilitating all without confirmation of the authentication (i.e. receiving confirmation of authentication or itself authenticating) of the bearer of the payment token.

Figure 3A:
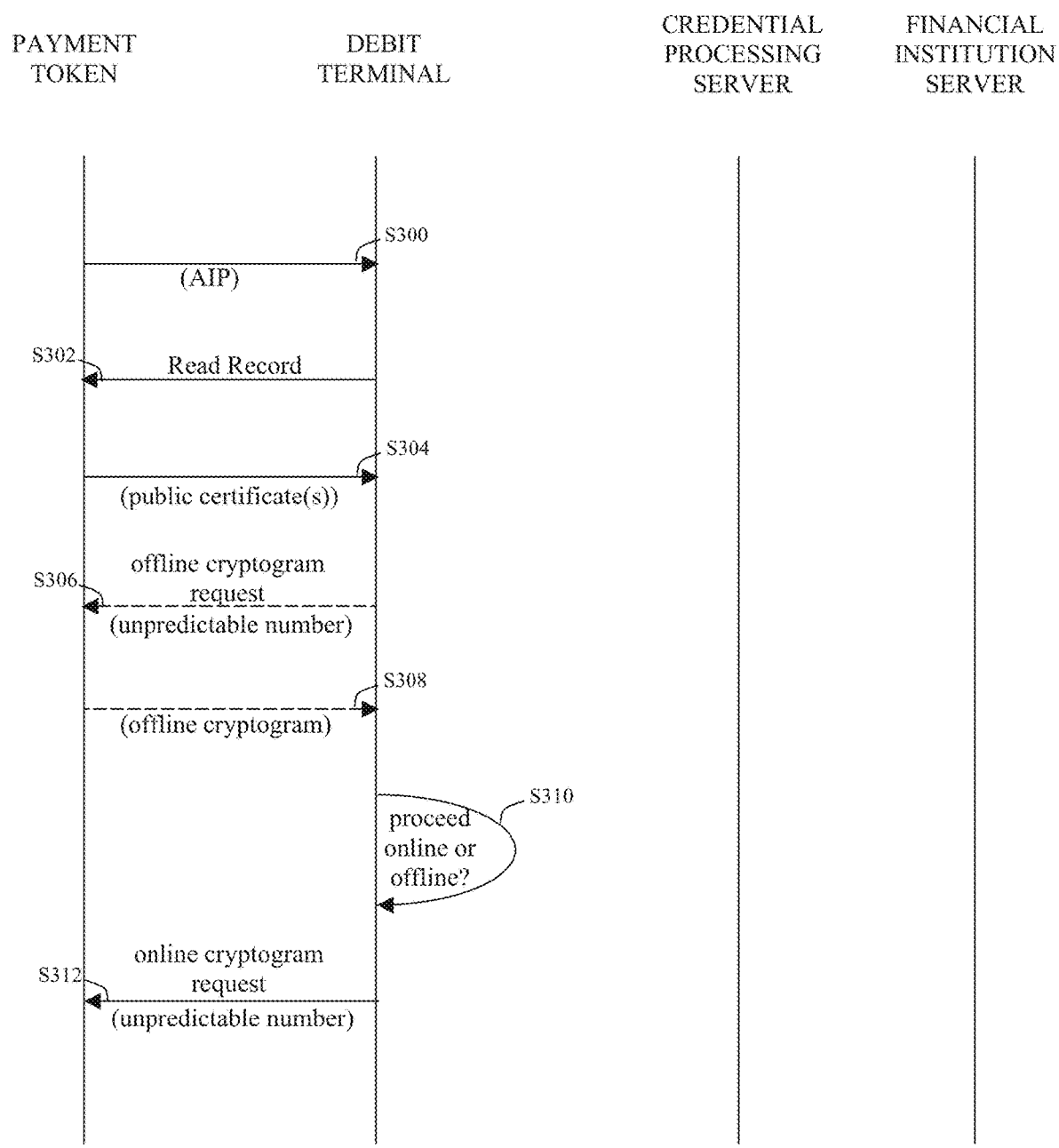
FIGS. 3a and 3b together comprise a message flow diagram depicting the method for processing a debit transaction.
Figure 3B:
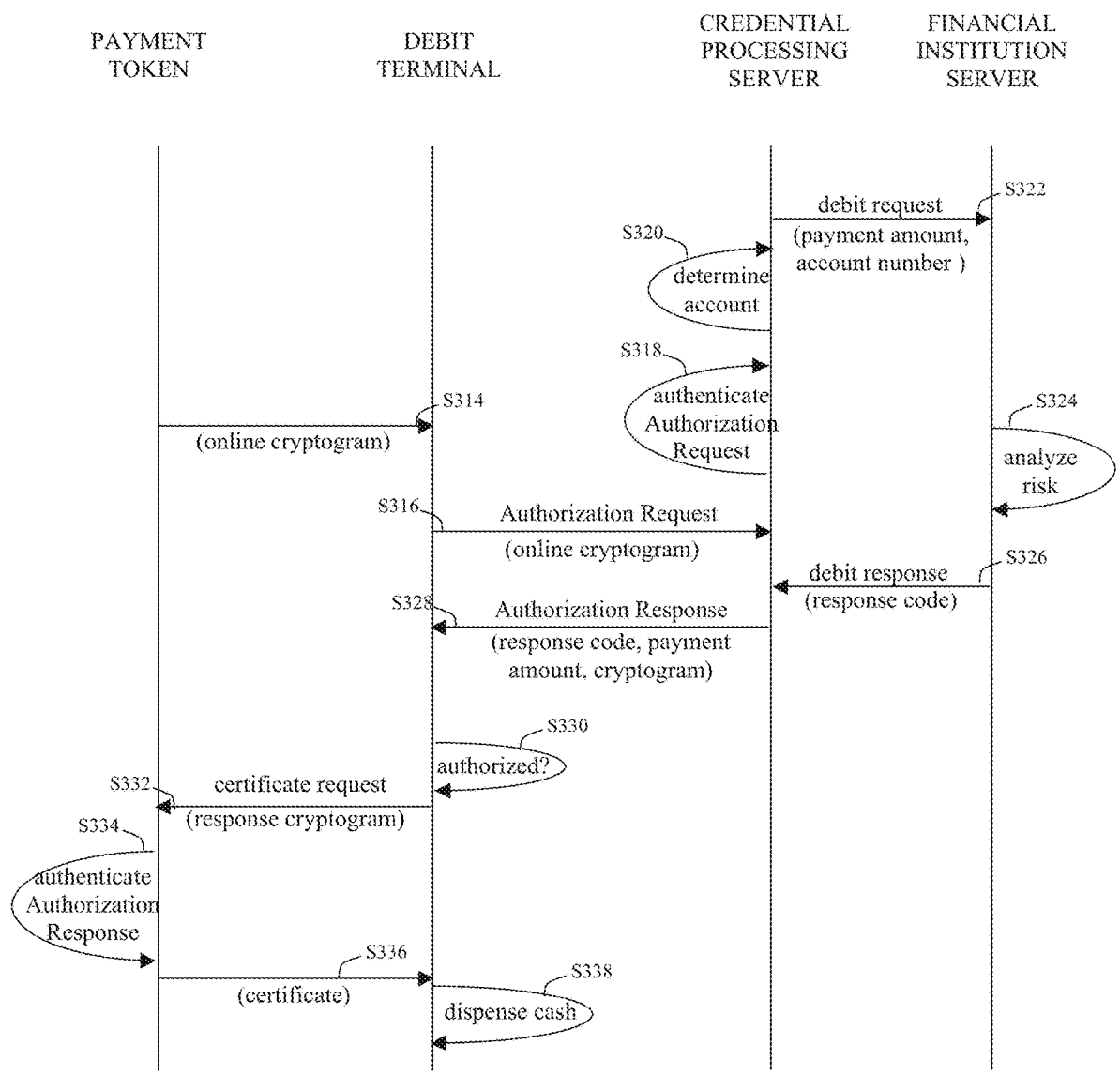

An example transaction authorizing method will now be discussed in detail with reference to FIGS. 3a and 3b. In the following example, the debit terminal 200 is implemented as an automated teller machine (ATM) or automated banking machine (ABM), and the payment token is implemented as a plastic payment card, or as an integrated circuit or computer software executing on a portable communications device.

A customer of the financial institution attends at a debit terminal 200, and interfaces a payment token with the payment card interface of the debit terminal 200. At step S300, the payment token provides the debit terminal 200 with an Application Interchange Profile (AIP) that identifies the capabilities of the payment token, such as the type of offline data authentication (discussed below) that the payment token supports.

At step S302, the debit terminal 200 transmits to the payment token a Read Record command for various data elements required by the debit terminal 200. Typically, the Read Record command requests a public digital certificate of the payment token and optionally also a public digital certificate of the issuer of the payment token. The payment token responds to the debit terminal 200, at step S304, with the data requested by the Read Record command.

The debit terminal 200 may then validate the payment token based on the type of offline data authentication (e.g. dynamic data authentication, static data authentication), if any, identified in the AIP (received at step S300). Preferably, however, the debit terminal 200 validate the payment token without requiring data input from the operator of the debit terminal 200 (bearer of the payment token). To do so, at step S306 the debit terminal 200 may request an offline cryptogram from the payment token. An offline cryptogram is a cryptogram that is generated from a cryptographic key, and which the debit terminal 200 can validate locally, without accessing online resources.

If the AIP indicates that the payment token supports "dynamic data authentication", the debit terminal 200 generates an unpredictable number, and includes the unpredictable number in the offline cryptogram request. In response, the payment token generates a cryptogram from the unpredictable number and a private cryptographic key of the payment token, and provides the debit terminal 200 with the cryptogram, at step S308. The debit terminal 200 then validates the payment token using the public certificate of the payment token to verify that the payment token generated the cryptogram.

If the AIP indicates that the payment token does not support dynamic data authentication, but instead supports "static data authentication", the debit terminal 200 receives from the payment token (in response to the Read Record command at step S302) pre-signed static application data that is stored on the payment token. The debit terminal 200 then validates the payment token using the public certificate of the payment token issuer to verify that the payment token issuer signed the static application data.

If the debit terminal 200 cannot validate the payment token, at step S310 the debit terminal 200 declines the funds withdrawal request. Otherwise, after the debit terminal 200 successfully authenticates the payment token, at step S310 the debit terminal 200 determines that the funds withdrawal request should be processed online (i.e. via the credential processing server 300).

If the debit terminal 200 determines that the funds withdrawal request should be processed online, at step S312 the debit terminal 200 requests an online cryptogram from the payment token. The transaction processor 220 generates an unpredictable number and incorporates the unpredictable number into the online cryptogram request. The transaction processor 220 may also incorporate into the online cryptogram request geographic data that identifies the location of the debit terminal 200. An online cryptogram is a cryptogram that is generated from a cryptographic key, and which the debit terminal 200 validates by accessing online resources (e.g. credential processing server 300).

Upon receipt of the online cryptogram request, the payment token generates an online cryptogram from a cryptographic key of the payment token and from a message authentication code that is generated from the unpredictable number (and optionally the geographic data) received from the debit terminal 200, the transaction date, the payment credential and the payment token internal transaction counter. The payment token may generate the online cryptogram by (i) generating a cryptographic session key from the payment token cryptographic master key and the transaction counter, and (ii) applying the unpredictable number, geographic data, transaction date, payment credential and transaction counter (collectively "Authorization Data") and the session key as inputs to a cryptographic algorithm. The payment token responds to the debit terminal 200 with the online cryptogram, at step S314.

At step S316, the debit terminal 200 generates an Authorization Request Message that includes the Authorization Data and online cryptogram, and forwards the Authorization Request Message to the credential processing server 300 via the first secure network 106. The Authorization Request Message requests authorization for the debit transaction initiated the debit terminal 200. As will be apparent from the foregoing discussion, the payment token provides the debit terminal 200 with the public certificate(s) (step S304), the offline cryptogram (step S308) and the online cryptogram (step S314), and the debit terminal 200 provides the credential processing server 300 with the Authorization Request Message (step S316) all without the customer (bearer of the payment token) providing any data input to the payment token or the debit terminal 200.

As discussed, the payment credential does not identify the payment amount to be debited, or the financial account to be used for the debit transaction. Further, the default payment amount and the financial account are not determinable from only the payment credential. Instead, since the payment credential does not identify the financial account number or the payment amount to be debited during the debit transaction, the default payment amount and the financial account should only be able to be determined by the credential processing server 300 querying the payment definition database 312 with the payment credential. Therefore, the Authorization Request Message does not include any particulars of the financial account, or the payment amount to be debited from the financial account.

At step S318, the credential processing server 300 authenticates the Authorization Request Message without receiving data input (e.g. without requiring input of a personal identification number) from the bearer of the payment token and preferably without receiving confirmation from the debit terminal 200 of the authenticity of the payment token. To do so, the credential processing server 300 may (i) recover the payment token's session key by applying the payment credential and transaction counter (included in the Authorization Data) and a card issuer cryptographic master key as inputs to a suitable cryptographic algorithm, (ii) decrypt the online cryptogram with the recovered session key, (iii) compute a message authentication code from the Authorization Data, and (iv) compare the computed message authentication code against the decrypted cryptogram.

At step S320, the credential processing server 300 queries the payment definition database 312 with the payment credential, thereby determining the default payment amount for the debit transaction, and determining the account number of the financial account that is uniquely associated with the payment credential. The credential processing server 300 may perform step S320 contemporaneously with, or prior to, step S318.

If the credential processing server 300 successfully authenticated the Authorization Request Message at step S318, the credential processing server 300 facilitates a debit in the default payment amount from the financial account by incorporating the account number, the default payment amount, and optionally the geographic data, into a debit request message, and forwarding the debit request message to the financial institution server 400 over the second secure network 108, at step S322.

As discussed, the Authorization Data of the Authorization Request Message includes the unpredictable number, geographic data, transaction date, payment credential and transaction counter. Therefore, preferably the Authorization Request Message does not include any data input received from the bearer of the debit terminal 200 or include any indication of the authenticity of the identity of the bearer of the debit terminal 200. Accordingly, preferably the credential processing server 300 receives the Authorization Request Message, determines the financial account and default payment amount, authenticates the Authorization Request Message, and facilitates the debiting of the financial account all without authenticating, and without receiving confirmation from the debit terminal 200 of the authenticity of, the identity of the bearer of the payment token.

At step S324, the financial institution server 400 applies its prevailing risk management rules to the debit transaction. Therefore, for example, the financial institution server 400 may determine whether the specified financial account is still active and has sufficient credit/funds to complete the transaction. Even if the financial account is still active and has sufficient credit/funds to complete the transaction, the financial institution server 400 may decline the transaction if a debit in the default payment amount would cause the maximum total debit amount for the associated financial account to be exceeded.

The financial institution server 400 may also use the geographic data (included with the debit request message) and/or particulars of the cardholder's previous transactions to determine whether the current financial transaction is consistent with the customer's transaction history. Therefore, for example, the financial institution server 400 may decline the transaction if the geographic data associated with the transaction indicate that it was unlikely for the customer to have travelled to the location of the current debit terminal 200 since the date/time of the previous transaction(s).

If the risk management analysis indicates that the debit transaction should proceed, the financial institution server 400 updates the accounts database to reflect the debit in the default payment amount from the specified financial account. Otherwise, the financial institution server 400 does not debit the specified financial account.

The financial institution server 400 then generates an authorization response code that indicates the outcome of the risk management analysis, and returns the authorization response code to the credential processing server 300 over the second secure network 108, at step S326.

The credential processing server 300 may then generate a response cryptogram from a cryptographic key of the payment token and from a message authentication code that is generated from the payment credential, authorization response code, default payment amount and online cryptogram. The credential processing server 300 may generate the response cryptogram by applying the payment credential, authorization response code, default payment amount, online cryptogram and session key as inputs to a suitable cryptographic algorithm.

At step S328, the credential processing server 300 generates an Authorization Response Message that includes the Authorization Data, authorization response code, default payment amount and response cryptogram, and directs the Authorization Response Message to the debit terminal 200 via the first secure network 106.

At step S330, the debit terminal 200 examines the authorization response code of the Authorization Response Message. If the authorization response code indicates that the credential processing server 300 and the financial institution server 400 authorized the transaction, at step S332 the transaction processor 220 requests a digital certificate from the payment token confirming that the credential processing server 300 generated the Authorization Response Message. The debit terminal 200 generates an unpredictable number and incorporates the Authorization Data, unpredictable number, authorization response code, default payment amount, and response cryptogram into the certificate request.

At step S334, the payment token determines whether the credential processing server 300 generated the response cryptogram. To do so, the payment token may (i) decrypt the response cryptogram with the payment token's session key, (ii) compute a message authentication code from the payment credential, authorization response code, default payment amount and online cryptogram, and (iii) compare the computed message authentication code against the decrypted cryptogram.

If the payment token confirms that the credential processing server 300 generated the response cryptogram and therefore that the credential processing server 300 and the financial institution server 400 authorized the transaction, the payment token generates the digital certificate from a cryptographic key of the payment token and from a message authentication code that is generated from the default payment amount, the unpredictable number received from the debit terminal 200, the transaction date, the payment credential and the transaction counter. The payment token may generate the digital certificate by (i) generating a session key from the payment token cryptographic master key and the transaction counter, (ii) applying the default payment amount, unpredictable number, transaction date, payment credential and transaction counter and the session key as inputs to a cryptographic algorithm, and (iii) signing the resulting cryptogram with a private cryptographic key of the payment token.

The payment token responds to the debit terminal 200 with the digital certificate, at step S336. The debit terminal 200 uses the public certificate of the payment token to confirm that the payment token generated the digital certificate from the default payment amount and therefore that the credential processing server 300 and the issuer server 300 authorized the transaction. The debit terminal 200 dispenses cash from the cash dispenser thereof to the customer, in the default payment amount, at step S338, upon receipt of the digital certificate confirming that the credential processing server 300 and the issuer server 300 authorized the transaction.

If the authorization response code indicates that the card issuer declined the transaction (or if, at step S310, the debit terminal 200 determined that the transaction should be declined), the debit terminal 200 notifies the customer that the debit transaction was declined and does not dispense cash from the cash dispenser.

The invention claimed is:

1. A method of authorizing a debit transaction comprising:
a debit terminal transmitting to a computer server an authorization request message requesting authorization for a debit transaction initiated from the debit terminal, the authorization request message including a payment credential, an online cryptogram and authorization data;
the computer server receiving the authorization request message, and authorizing the debit transaction without receiving confirmation of authenticity of an identity of an operator of the debit terminal, the authorizing the debit transaction comprising the computer server:
(i) recovering a session key by applying the payment credential and a cryptographic master key as inputs to a cryptographic algorithm,
(ii) decrypting the online cryptogram with the session key,
(iii) computing a message authentication code from the authorization data,
(iv) confirming that the computed message authentication code matches the decrypted online cryptogram,
(v) from a payment definition database, determining an account number and a default payment amount associated with the payment credential in the payment definition database, and
(vi) debiting a financial account associated with the account number by a debit amount equal to the default payment amount;
the computer server transmitting to the debit terminal an authorization response message including the debit amount;
the debit terminal receiving the authorization response message; and
without the debit terminal confirming the authenticity of the identity of the operator, the debit terminal releasing funds in the debit amount in response to the authorization response message.

2. The method according to claim 1, further comprising the debit terminal transmitting the authorization request message to the computer server without confirming the authenticity of the identity of the operator.

3. The method according to claim 1, wherein the debiting the financial account comprises the computer server:

transmitting a debit request message to another computer server managing the financial account, the debit request message including the account number and the default payment amount; and
receiving from the another computer server a debit response message confirming the debiting of the financial account by the debit amount.

4. The method according to claim 1, wherein the debit terminal transmitting the authorization request message comprises the debit terminal receiving the online cryptogram from a payment token interfaced with the debit terminal, and the authorizing the debit transaction comprises the computer server confirming the online cryptogram without the computer server receiving confirmation of authentication of the payment token.

5. The method according to claim 1, wherein the debit terminal includes an input device, and the transmitting an authorization request message comprises the debit terminal transmitting the authorization request message without the debit terminal receiving input from the input device.

6. The method according to claim 1, wherein the payment definition database identifies a maximum debit rate comprising a maximum total allowable amount that may be withdrawn within a predetermined period of time, and the debiting the financial account comprises the computer server confirming that the debit transaction does not exceed the maximum debit rate.

7. The method according to claim 1, wherein a debit request message includes a geographic data associated with a location of the debit terminal, the computer server receives a plurality of previously transmitted authorization request messages each requesting authorization for a respective debit transaction, and the debiting the financial account comprises the computer server confirming that the geographic data included with a last one of the plurality of previously transmitted authorization request messages is consistent with the geographic data included with the debit request message.

8. A credential processing server comprising:
a memory storing computer processing instructions and a payment definition database; and
a computer processing unit in communication with the memory, the computer processing instructions causing the computer processing unit to:
receive from a debit terminal an authorization request message requesting authorization for a debit transaction initiated from the debit terminal, the authorization request message including a payment credential, an online cryptogram and authorization data;
authorize the debit transaction without receiving confirmation of authenticity of an identity of an operator of the debit terminal, the authorizing the debit transaction comprising the computer processing unit:
(i) recovering a session key by applying the payment credential and a cryptographic master key as inputs to a cryptographic algorithm,
(ii) decrypting the online cryptogram with the session key,
(iii) computing a message authentication code from the authorization data,
(iv) confirming that the computed message authentication code matches the decrypted online cryptogram,
(v) from the payment definition database, determining an account number and a default payment amount associated with the payment credential in the payment definition database, and (vi) debiting a financial account associated with the account number by a debit amount equal to the default payment amount;

transmit to the debit terminal an authorization response message including the debit amount and authorizing the debit terminal to release funds in the debit amount.

9. The credential processing server according to claim 8, wherein the computer processing instructions cause the computer processing unit to debit the financial account by:

transmitting a debit request message to another computer server managing the financial account, the debit request message including the account number and the default payment amount; and receiving from the another computer server a debit response message confirming the debiting of the financial account by the debit amount.

10. The credential processing server according to claim 8, wherein the payment definition database identifies a maximum debit rate comprising a maximum total allowable amount that may be withdrawn within a predetermined period of time, and the computer processing instructions cause the computer processing unit to debit the financial account by confirming that the debit transaction does not exceed the maximum debit rate.

11. The credential processing server according to claim 8, wherein a debit request message includes geographic data associated with a location of the debit terminal, and the computer processing instructions cause the computer processing unit to debit the financial account by confirming that the geographic data included with a last one of a plurality of previously transmitted authorization request messages is consistent with the geographic data included with the debit request message.

12. A non-volatile computer-readable medium storing computer processing instructions and a payment definition database, the computer processing instructions, when executed by a computer server, causing the computer server to:

receive from a debit terminal an authorization request message requesting authorization for a debit transaction initiated from the debit terminal, the authorization request message including a payment credential, an online cryptogram and authorization data;

authorize the debit transaction without receiving confirmation of authenticity of an identity of an operator of the debit terminal, the authorizing the debit transaction comprising the computer server:

(i) recovering a session key by applying the payment credential and a cryptographic master key as inputs to a cryptographic algorithm, (ii) decrypting the online cryptogram with the session key, (iii) computing a message authentication code from the authorization data, (iv) confirming that the computed message authentication code matches the decrypted online cryptogram, (v) from the payment definition database, determining an account number and a default payment amount associated with the payment credential in the payment definition database, and (vi) debiting a financial account associated with the account number by a debit amount equal to the default payment amount;

transmit to the debit terminal an authorization response message including the debit amount and authorizing the debit terminal to release funds in the debit amount.

13. The computer-readable medium according to claim 12, wherein the computer processing instructions cause the computer server to debit the financial account by:

transmitting a debit request message to another computer server managing the financial account, the debit request message including the account number and the default payment amount; and receiving from the another computer server a debit response message confirming the debiting of the financial account by the debit amount.

\* \* \* \* \*